United States Patent
Harootian

(12)
(10) Patent No.: US 6,252,231 B1
(45) Date of Patent: Jun. 26, 2001

(54) X-RAY ABSORBING, LIGHT REFLECTIVE MEDIUM FOR X-RAY DETECTOR ARRAY

(75) Inventor: Simon George Harootian, Worcester, MA (US)

(73) Assignee: Analogic Corporation, Peabody, MA (US)

(*) Notice: Subject to any disclaimer, the term of this patent is extended or adjusted under 35 U.S.C. 154(b) by 0 days.

(21) Appl. No.: 09/236,935

(22) Filed: Jan. 25, 1999

(51) Int. Cl.$^7$ .................................................. G01T 1/202
(52) U.S. Cl. ........................................... 250/368; 250/367
(58) Field of Search ..................................... 250/368, 367

(56) References Cited

U.S. PATENT DOCUMENTS

| | | | |
|---|---|---|---|
| 3,936,645 | * 2/1976 | Iversen | 250/370.11 |
| 4,747,973 | * 5/1988 | Cusano et al. | 252/301.4 R |
| 4,982,096 | 1/1991 | Fujii et al. | 250/367 |
| 5,059,800 | 10/1991 | Cueman et al. | 250/367 |
| 5,382,798 | * 1/1995 | Mouyen | 250/370.11 |
| 5,440,129 | * 8/1995 | Schmidt | 250/366 |

* cited by examiner

*Primary Examiner*—Constantine Hannaher
(74) *Attorney, Agent, or Firm*—McDermott, Will & Emery

(57) ABSTRACT

An x-ray detector system for a computed tomography (CT) scanner includes a plurality of x-ray scintillating crystals disposed in an array. A highly dense, light-reflective, x-ray absorbent medium is disposed in the spaces between adjacent crystals. In a preferred embodiment, the medium comprises a mixture of tantalum pentoxide and an optically transparent epoxy.

6 Claims, 1 Drawing Sheet

X-RAY ABSORBING, LIGHT REFLECTIVE MEDIUM FOR X-RAY DETECTOR ARRAY

TECHNICAL FIELD

The present invention relates to x-ray detector systems for computed tomography (CT) scanners.

BACKGROUND OF THE INVENTION

CT scanners are typically used to obtain images of internal anatomical structures of a patient, or of objects inside containers, such as luggage or packages for transport, which cannot easily be identified other than through time-consuming manual inspections. X-rays are projected into the object to be scanned in a fan-shaped beam, and x-rays passing through the object are detected by an x-ray detector system disposed on the opposite side of the object from the source of the x-rays. The intensity of the detected x-rays is inversely proportional to the density of the structures in the path of the x-rays. An image of the scan plane can be reconstructed from the x-ray intensity data. Reconstructed images of successive scan planes can be integrated to form a three-dimensional image of the object.

X-ray detector systems for CT scanners typically include a plurality of scintillating crystals which are responsive to x-rays, a corresponding plurality of photodiodes which receive light generated by the crystals in response to x-radiation thereof and convert the light to electrical signals, and a cable or other connector for transmitting the signals from the photodiodes to a data acquisition system for reconstructing an image from the x-ray intensity data.

For greatest accuracy and resolution in the reconstructed image, light generated within the scintillator crystals should all be transmitted to the corresponding photodiodes with minimum losses from absorption and scattering. The scintillating crystals in CT scanners generally are therefore covered with some type of light reflecting medium, such as, for example, a white- or light-colored paint containing, for example, titanium dioxide.

In addition to obtaining maximum light output from a scintillating crystal array, it is desirable to achieve maximum x-ray absorption by the spaces between adjacent crystals so as to prevent x-rays from passing directly to the photodiodes and generating random noise. Hence, the crystals may additionally be covered with an x-ray absorbing medium such as, for example, lead oxide. However, lead oxide is relatively dark in color and thus absorbs light instead of reflecting light. Therefore, its use with a light-reflective medium reduces the efficacy of the light-reflective medium and results in light losses which can be significant.

X-ray detector arrays typically are assembled with corresponding arrays of anti-scatter plates to reduce the amount of scattered x-rays which enter the scintillator crystals. The anti-scatter plates are aligned to be substantially parallel to x-ray beams emanating from the focal spot of the x-ray source and are typically disposed over the spaces between adjacent crystals. Positioned in this manner, the anti-scatter plates absorb scattered radiation and also shield the spaces between adjacent crystals, thereby minimizing x-ray passage into the photodiodes. However, in two-dimensional detector arrays, the crystals are arranged in multiple columns and rows, and the spaces between adjacent crystals in the direction normal to the plane of the fan beam are not shielded by anti-scatter plates and thus are exposed to x-rays. If light-reflective and x-ray absorbent media are used together, as known in the prior art, light absorption is increased and light reflection decreased, as discussed above. Because the light-reflective and x-ray absorbing medium between the crystals is generally much less dense than the material comprising the scintillating crystals, at least a portion of the x-rays that impinge on the spaces between adjacent crystals will likely pass through to the photodiodes below the crystals and generate random noise signals which reduce the sensitivity of the scanner and the accuracy of the reconstructed image.

It would therefore be an advantage to provide an x-ray detector system which maximizes light output by the scintillator crystals while preventing passage of x-rays into the photodiodes.

SUMMARY OF THE INVENTION

According to one aspect of the invention, there is provided an x-ray detector system, including a plurality of scintillating crystals arranged in an array, a corresponding plurality of photodiodes arranged so that each photodiode receives light energy from a scintillating crystal and generates a representative electrical signal, and an electrical connector for transmitting the electrical signals from each photodiode to a data acquisition system. The x-ray detector system further includes a light reflective, x-ray absorbent medium disposed in the spaces between adjacent scintillating crystals.

The light reflective, x-ray absorbent medium preferably comprises, in one embodiment, a mixture of an optically transparent curable vehicle and tantalum pentoxide. In a preferred embodiment, the substantially transparent curable vehicle is an epoxy.

The ratio of the amount of tantalum pentoxide to the amount of epoxy by weight in the mixture is preferably at least approximately 1:1.

The scintillating crystals can be arranged in any type of one- or two-dimensional array.

These and other objects and advantages of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be made to the following detailed description taken in connection with the accompanying drawings, in which.

Like elements in the FIGURES are denoted with like reference numerals.

DETAILED DESCRIPTION OF THE DRAWINGS

Figure 1:
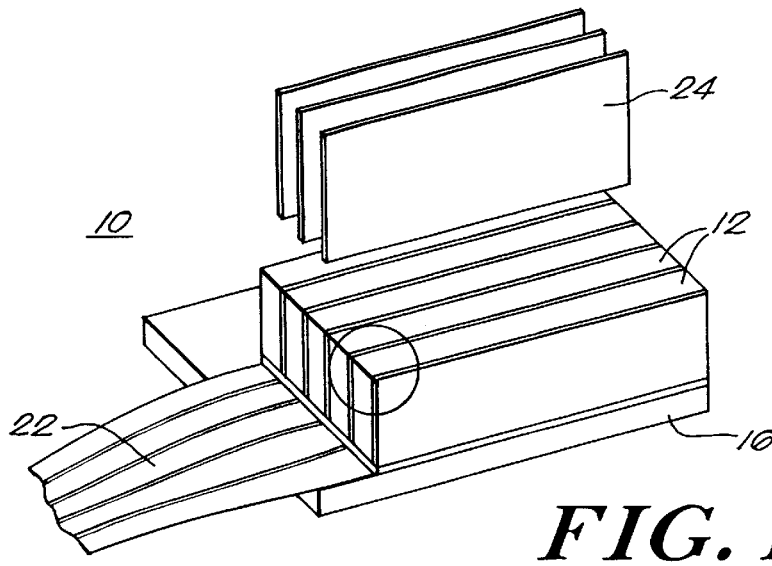
FIG. 1 is a side view of a one-dimensional x-ray detector array.
Figure 2:
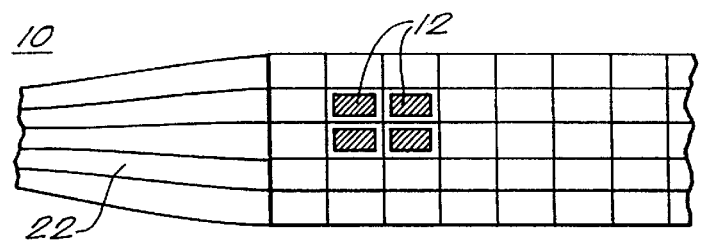
FIG. 2 is a plan view of a two-dimensional x-ray detector array.

Typical x-ray detector systems in a CT scanner are illustrated in FIGS. 1 and 2. The x-ray detector system 10 includes a plurality of scintillating crystals 12 arranged in an array. The detector system of FIG. 1 is a one-dimensional array, in which the crystals are disposed next to each other in a single row, whereas the detector system of FIG. 2 is a two-dimensional array of individual crystals.

Figure 3:
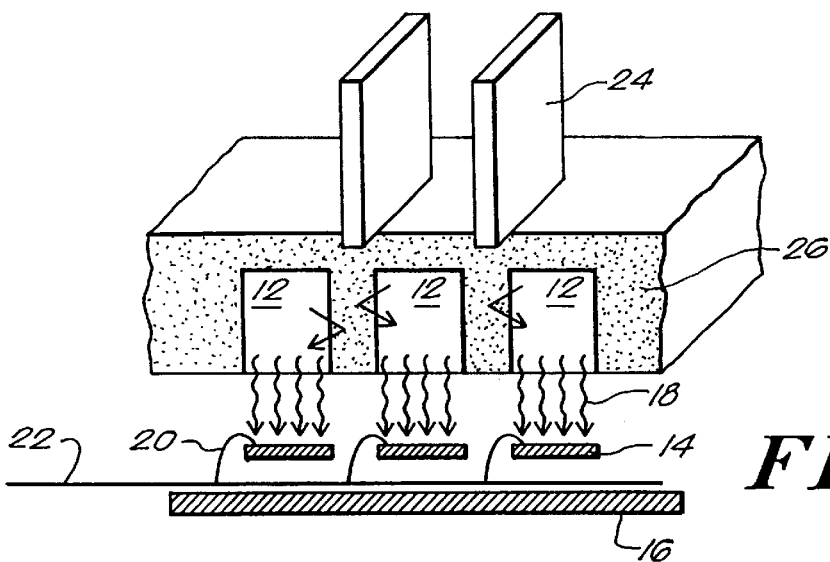
FIG. 3 is an enlarged cross-sectional view of a typical x-ray detector array.

Underlying each crystal is a corresponding photodiode 14, shown in FIG. 3. The photodiodes 14 are arranged on a support substrate 16 so that they receive light 18 from the scintillating crystals and convert the light into an electrical signal which is transmitted via an electrical connector 20 to a data acquisition system (not shown) via a cable 22 or other connection element. A plurality of anti-scatter plates 24 may be arranged over the scintillating crystals to collimate x-rays and prevent scattered radiation from impinging on the crystals.

As shown in FIG. 3, the spaces between adjacent scintillating crystals are preferably filled with a substantially light-reflective, x-ray absorbent medium 26. The medium 26 is preferably a mixture of a substantially optically transparent curable vehicle, such as an epoxy, which is curable upon exposure to light or thermal energy, and tantalum pentoxide, $Ta_2O_5$, which may be in the form of a white powdered solid. The mixture preferably comprises a white, highly reflective paste or slurry which can easily be applied by capillary flow or injection into the interstitial spaces between adjacent detector crystals.

A significant advantage of tantalum pentoxide over either titanium dioxide or lead oxide, or both together, is that tantalum pentoxide is both highly light-reflective and highly x-ray absorbent, due to its relatively high density (8.2 grams/cm$^3$). Moreover, because of its relatively high reflectivity and density, it can be used in relatively high concentrations, which need not be limited except to control the viscosity of the resulting mixture. Thus, an application of tantalum pentoxide can eliminate the requirement that both titanium dioxide and lead oxide be used, thus reducing manufacturing and labor costs.

In a preferred embodiment, tantalum pentoxide is mixed with an optically transparent epoxy in at least approximately a 1:1 weight ratio, although higher or lower concentrations of tantalum pentoxide can be used and are considered to be within the scope of the invention.

The use of tantalum pentoxide as a medium in the spaces between adjacent scintillating crystals has several advantages in addition to superior light reflectivity and x-ray absorbency over that of either titanium dioxide or lead oxide or a combination of both. The use of a curable and optically transparent epoxy as the vehicle for the tantalum pentoxide contributes to the structural support and mechanical strength of the crystal array, particularly in two-dimensional arrays, without diminishing the reflectivity of the tantalum pentoxide. Better light reflectivity and x-ray absorbency leads to reduced noise in the resulting signals, and thus greater sensitivity of the scanner and accuracy of the resulting images. Moreover, the spectral reflectivity range of tantalum pentoxide extends into the ultraviolet region as well as the visible region of light.

Because certain changes may be made in the above apparatus without departing from the scope of the invention herein disclosed, it is intended that all matter contained in the above description or shown in the accompanying drawings shall be interpreted in an illustrative and not a limiting sense.

I claim:

1. An x-ray detector system, including a plurality of scintillating crystals arranged in an array, a corresponding plurality of photodiodes arranged so that each photodiode receives light energy from a scintillating crystal and generates a representative electrical signal, and electrical connection means for transmitting electrical signals from each photodiode to a data acquisition system, wherein the x-ray detector system further includes a light reflective, x-ray absorbent medium disposed in the spaces between adjacent scintillating crystals, the medium containing tantalum pentoxide.

2. An x-ray detector system according to claim 1, wherein the light reflective, x-ray absorbent medium comprises a mixture of an optically transparent curable vehicle and tantalum pentoxide.

3. An x-ray detector system according to claim 2, wherein the optically transparent curable vehicle is an epoxy.

4. An x-ray detector system according to claim 3, wherein the ratio of the amount of tantalum pentoxide to the amount of epoxy by weight in said mixture is at least approximately 1:1.

5. An x-ray detector system according to claim 1, wherein the scintillating crystals are arranged in a one-dimensional array.

6. An x-ray detector system according to claim 1, wherein the scintillating crystals are arranged in a two-dimensional array.

* * * * *